May 21, 1946.  F. A. SHERMAN  2,400,609
CURRENT CONVERSION DEVICE
Filed Oct. 16, 1944  3 Sheets-Sheet 1
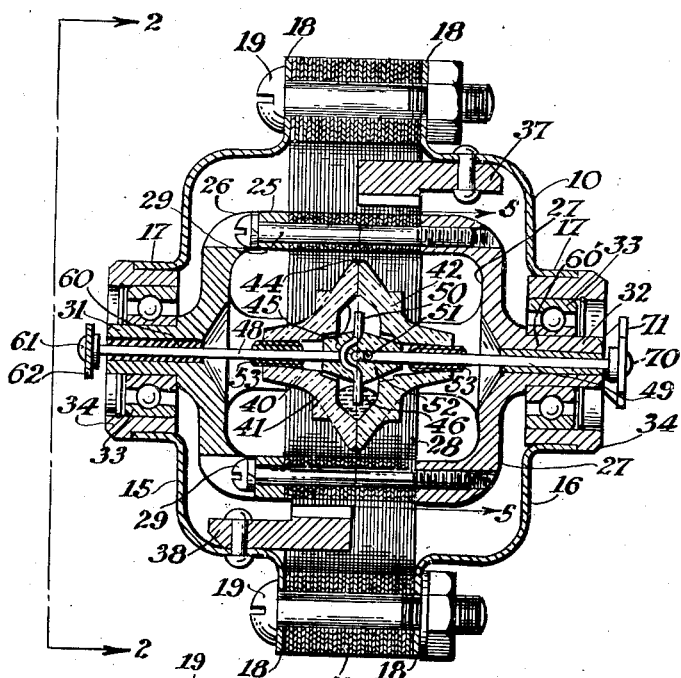
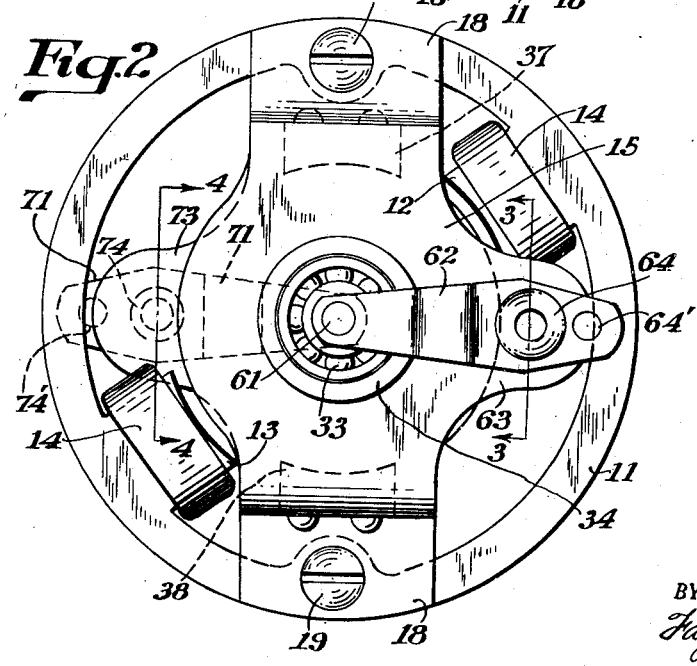
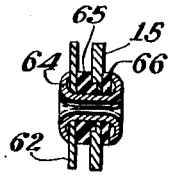
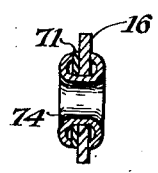
INVENTOR.
FLOYD A. SHERMAN.
BY
Fay, Gobrick, Chilton & Isler
Attorneys.

May 21, 1946.  F. A. SHERMAN  2,400,609
CURRENT CONVERSION DEVICE
Filed Oct. 16, 1944   3 Sheets-Sheet 2

INVENTOR.
FLOYD A. SHERMAN.
BY
Fay, Golrick, Chilton & Isler.
Attorneys.

May 21, 1946.  F. A. SHERMAN  2,400,609
CURRENT CONVERSION DEVICE
Filed Oct. 16, 1944   3 Sheets-Sheet 3

INVENTOR.
FLOYD A. SHERMAN.
BY
Fay, Golrick, Chilton & Isler.
Attorneys.

Patented May 21, 1946

2,400,609

UNITED STATES PATENT OFFICE 2,400,609

CURRENT CONVERSION DEVICE

Floyd A. Sherman, Cleveland, Ohio, assignor to National Electronics Corporation, Cleveland, Ohio, a corporation of Ohio Application October 16, 1944, Serial No. 558,919

17 Claims. (Cl. 172—36)

The present invention relates, as indicated, to a current conversion device, and more particularly to a device for changing direct current into pulsating unidirectional current or alternating current.

It is a common practice to transform a relatively low voltage direct current into higher voltage unidirectional current by using a transformer having the primary coil thereof connected with the source of the low voltage current through a circuit which includes a device, which is generally a rapidly operating switch mechanism for interrupting the direct current flow to produce a pulsating, unidirectional current. Also, by suitable circuit and other arrangements, an alternating current through the primary coil may be effected. In either event, the mechanism operates to make and break the circuit many times per second and, heretofore, these mechanisms have been a source of trouble due to contact difficulties and other mechanical failures.

An object of the present invention is to provide a current conversion device having a current interrupting means that is compact, efficient in operation and which will last indefinitely without replacements of parts or other attention.

Another object of the present invention is to provide a device of the character described in which the current interrupting means is actuated by a rotor of an electric motor, which rotor is driven by a stator having field windings connected in a circuit with the current interrupting means.

Another object of the invention is to provide a compact device of the type described in the preceding paragraph, which is trouble-free and is practically non-destructible, notwithstanding the rapidity of the current interruption.

In carrying out the invention, it is an object to provide a rotatable cell having axially aligned electrodes which extend into the interior of a cell member and which have parts contacting an electro-conductive flowing body disposed within the cell, the rotation of the cell effecting a rapid make and break of a current through the electrodes and electro-conductive body.

Still another object of the invention is to provide a device of the character described comprising an electric motor having a rotor which is hollowed out and in which is carried a current interrupting or selecting means that is actuated by rotation of the rotor, such means being connected in the circuit of the motor for establishing pulsating or selective current to the motor windings, said device being free from commutators, brushes or other similar current changing means.

Other objects and advantages of my invention will be apparent from the following description of forms of embodiments of the invention, reference being made to the accompanying drawings wherein:

Fig. 1 is a view in section of a current conversion device;

Fig. 2 is a view in elevation of the device shown in Fig. 1, the view being taken along the line 2—2 of Fig. 1;

Fig. 3 is a view in section taken on the line 3—3 of Fig. 2;

Fig. 4 is a view in section taken on the line 4—4 of Fig. 2;

Figure 5:
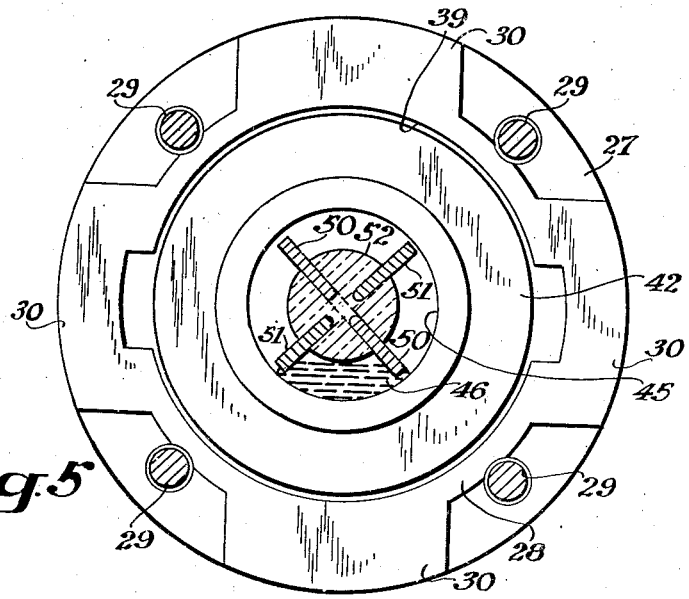
Fig. 5 is a view in section taken on the line 5—5 of Fig. 1, the parts being shown on a larger scale than in Fig. 1.

Referring to the drawings, I have shown a current conversion device 10 which is adapted to convert the non-pulsating direct current of a battery, for example, into a pulsating current which may be transformed into a higher voltage. Such devices have utility in the transforming of the low voltage direct current of an automobile battery to a higher voltage pulsating current suitable for use in a radio circuit. It is to be understood, however, that the device 10 is merely a preferred form of embodiment of the invention and other forms of the invention could be used and yet fall within the scope of my invention.

The device 10 includes an annular stator 11 having two opposed pole pieces 12 and 13. Preferably, the stator is made up of a plurality of laminations which are formed of a magnetic material. The poles 12 and 13 each have field windings 14, which windings are connected in series. Two end plates 15 and 16, which may be formed of stampings, are provided with hub portions 17 and laterally extending flanges 18. The laminations of the stator 11 are interposed between the flanges 18 of the plates 15 and 16, and the plates and stator are secured together by bolts and nuts, as shown at 19.

A rotor 25 is mounted in the plates 15 and 16 and this rotor comprises cap-like end members 26 and 27, which are preferably formed of magnesium, and a plurality of laminations 28, formed of a magnetic material, are interposed between the members 26 and 27 and secured therebetween by screws 29. The laminations 28 are formed with four pole pieces 30 and have central openings 39 therein so that the rotor is hollow. The outer ends of members 26 and 27 are provided with tubular axial parts 31 and 32 respectively which are journalled in ball bearings 33 mounted in housings 34 secured in the hubs 17 of the end plates 15 and 16. It will be understood that the rotor 25 will be rotated by the magnetic field created by the coils 14 when the coils are energized by a pulsating current.

To insure self-starting of the rotor when the field windings are first energized, two permanent magnets 37 and 38 are mounted on the plates 15 and 16 on opposite sides of the rotor. The magnet 37 is spaced approximately 60° from the stator pole 12 and the magnet 38 is spaced approximately 60° from the pole 13. Thus, when the field windings are deenergized the magnets 37 and 38 will cause the armature 25 to stop in a position where two opposite poles 30 of the rotor will be slightly out of alignment with the poles 12 and 13, respectively, so that upon energization of the field windings the rotor will be started without external assistance.

A current interrupting or cell assembly is mounted wholly within the hollowed out portion of the rotor 25, and this assembly comprises a cell 40 which is made up of two complementary members or cell halves 41 and 42, which members are preferably formed of a glass-like material, such for example as that known commercially as "Nonex." The members 41 and 42 are joined together about their outer peripheries at 44, as by fusion, and they form an annular channel or race 45, in which a globule of highly refined pure mercury 46 is disposed. The cell 40 is supported within the rotor 25 by two rod-like electrodes 48 and 49, which electrodes are preferably formed of tungsten wire. The electrodes are in axial alignment and extend through hub portions formed in the members 41 and 42 of the cell 40. The inner end of each of the electrodes 48 and 49 has two portions extending in opposite directions and at right angles to the electrodes. These portions are formed by yoke-shaped tungsten wires or electrodes 50 and 51 welded at the central parts thereof to the ends of the rods 48 and 49, respectively. The ends of the electrodes 48 and 49 carrying the electrodes 50 and 51 are embedded in a dielectric body 52, which body may be formed of glass similar to members 41 and 42, and the outer ends of the electrodes 50 and 51 extend from the body 52 into the race 45. The yoke-shaped electrodes are disposed at right angles relative to one another and the central portions thereof are in the form of a U-curve for spacing the ends of the electrodes 48 and 49 from one another, but allowing the ends of the electrodes 50 and 51 extending from the body 52 to lie in a common plane. The quantity of mercury in the cell 40 is such that each tine of the electrodes 50 and 51 will be immersed in the mercury once during each revolution of the cell about the axis of the electrodes, but since the tines are spaced 90 degrees apart, a closed circuit through each pair of adjacent tines will be established four times during each revolution of the cell. The circuit is thus made and broken through the electrodes 48 and 49 four times during each revolution of the cell. The electrodes 48 and 49 are sealingly attached to the hub portions of the members 41 and 42 by a suitable fusible material 53, which may be fused beads of uranium glass. In the construction of the cell assembly, prior to sealing the electrodes 48 and 49 with the members 41 and 42, respectively, the interior of the cell 40 is evacuated for preventing deleterious effects which air might have on the mercury or electrodes in making and breaking the circuit through the electrodes and mercury.

The electrode 48 is supported on the axial or hub portion 31 of the armature 25 and is insulated from the armature by a bushing 60 of suitable insulating material, such as fiber. The electrode 49 is supported in the axial or hub portion 32 of the armature 25, with a bushing 60' interposed between it and the armature, such bushing being preferably formed of bronze. The upper end of electrode 48 is pressed by a silver contact 61 carried on a resilient contact strip 62, which is preferably formed of beryllium copper. The strip 62 is secured to an ear 63, formed on the plate 15 by a rivet 64. An insulating washer 65 is interposed between the strip 62 and the plate 15, and a washer 66 is interposed between the turned over end of rivet 64 and plate 15. The electrode 48 may be connected in a circuit as by soldering a wire to a terminal point 64' on the strip 62.

The outer end of the electrode 49 is pressingly engaged by a silver contact 70 which is mounted on a strip 71 which is similar to the strip 62. Strip 71 is secured to an ear 73 formed on the plate 16 by a rivet 74. The rivet 74 maintains the strip 71 in firm electrical conducting contact with the plate 16. The electrode 49 may be connected in a circuit as by soldering a wire to a terminal point 74' on the strip 71.

The cell 40 is suspended within the armature 25 in a position in which the two electrodes 50 and 51 will be simultaneously in contact with the mercury 46 when the device 10 is not in use. This position is illustrated in Fig. 5, and a circuit may be established through the device when it is in the position just described. It may be pointed out here that, for the sake of clearness in describing the various elements, the position of the cell relative to its axis shown in Fig. 1 is approximately 45° out of position. The correct position is illustrated in Fig. 5, in which the electrodes 50 and 51 are both immersed in the mercury 46.

Figure 6:
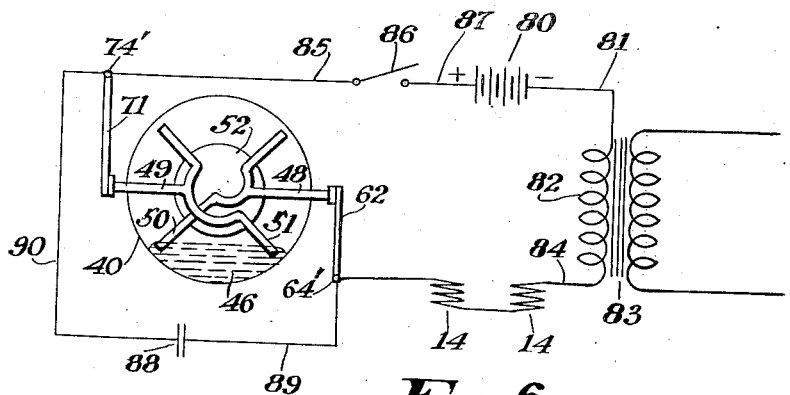
Fig. 6 is a wiring diagram of one form of the embodiment of the invention.

Referring to Fig. 6, I have shown a schematic wiring arrangement in which the device 10 is used for changing a non-pulsating direct current to a pulsating current for use in a radio transformer. A battery 80 is shown, which may be a six-volt battery, for example, and a circuit may be established from the negative pole of the battery through a wire 81 to the primary coil 82 of the radio transformer 83, coil 82 through wire 84 to the field windings 14, terminal 64', strip 62 to the electrode 48, electrode 50, mercury 46, electrode 51, electrode 49, strip 71, terminal 74', wire 85 to a manual switch 86, and through wire 87 to the positive pole of the battery 80. Thus, when the switch 86 is closed, a circuit is established through the current interrupting device, by the circuit just described, and the field windings cause rotation of the rotor 25. The circuit to the windings 14 is interrupted when either one of the electrodes 50 or 51 leaves the mercury body 46 and the momentum of the rotor brings the succeeding electrode into contact with the mercury 46 for momentarily reestablishing the circuit. It will be seen that the circuit through the primary coil 82 of the transformer 83 will be interrupted four times during each revolution of the rotor and that this interruption causes the rotor to be driven and provides a pulsating current for the transformer primary.

In order to stabilize the pulsating current, I have provided a suitable condenser 88 which is connected in parallel with the switch 40 by wires 89 and 90, which are connected to the terminals 64' and 74', respectively.

Figure 7:
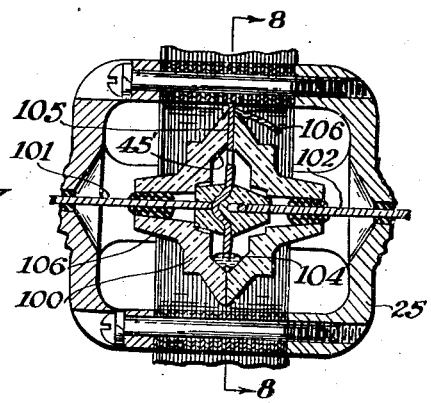
Fig. 7 is a fragmentary view, in section, of a device similar to that shown in Fig. 1, showing another form of my invention.

Referring to Fig. 7, I have shown another form of current interrupting device which may be mounted within the rotor 25. In this embodiment of the invention I have shown a cell 100, that is similar to the cell 40, and electrodes 101 and 102 which are similar to the electrodes 48 and 49 extend into the cell and the inner ends thereof are embedded in a glass body similar to body 52. The embedded ends of electrodes 101 and 102 are connected with wires 107 and 108, respectively, the ends of which extend into the race 45' of the cell 100. A third electrode 103, annular in form, is disposed within the cell and the annular portion thereof lies within the race 45' of the cell so that it is contacted by a globule of mercury 104 at all times. Preferably, the electrode 103 is composed of tungsten. The quantity of mercury in the cell 100 is somewhat less than the quantity in the cell 40 so that only a single electrode 107 or 108 will contact the mercury at one time. An end part 105 of the electrode 103 extends through the wall of the cell 100, the part 105 being embedded in the wall, and a lead wire 106 is connected with the end of the portion 105 and leads to a ring contact mounted on the rotor 25. The ring contact is engaged by a suitable contact which may be a strip of beryllium copper, mounted at one end of the end plate 15 and insulated therefrom. It will be apparent that when the rotor 25 is rotated, the mercury 104 will establish electrical contact between the annular electrode 103 and the electrodes 101 and 102 alternately by way of electrode wires 107 and 108.

Figure 8:
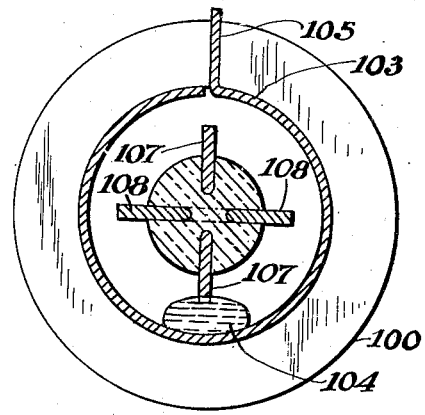
Fig. 8 is a view taken substantially along the line 8—8 of Fig. 7, but on a larger scale.
Figure 9:
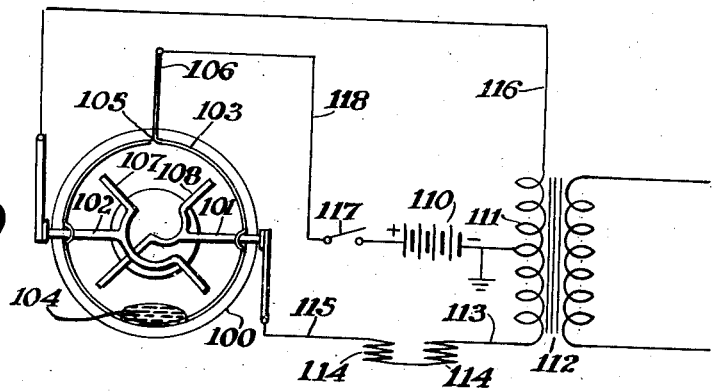
Fig. 9 is a wiring diagram of a modified form of my invention.

A circuit, such as that shown in Fig. 9, which may be a circuit for a radio transformer in which an alternating current characteristic is desired in the secondary illustrates the utility of the modification shown in Figs. 7 and 8. In this instance a battery 110 is connected at the negative pole with the central portion of the primary winding 111 of a transformer 112. One end of the winding 111 is connected by wire 113 to the stator windings 114 and the windings 114 are connected by wire 115 to electrode 101. The positive pole of the battery 110 is connected to a manual switch 117 and the switch 117 is connected by wire 118 to the electrode 103. It will be seen that when the cell 100 is in a position in which contact is established through electrodes 103 and 101, for example, the following circuit will be established: from the negative pole of the battery 110, transformer coil 111, wire 113, windings 114, wire 115, electrode 101, mercury 104, electrode 103, wire 118, switch 117 and to the battery. As the field windings are energized, the rotor 25 is turned and electrode 102 will then contact the mercury, establishing the following circuit: from the negative pole of battery 110, transformer coil 111, wire 116, electrode 102, mercury 104, electrode 103, wire 118, switch 117 and to the battery. Thus, the primary transformer coil 111 is supplied with an alternating current, and in the embodiment shown, the output current of the transformer will reverse direction four times per revolution of the rotor.

The device should be supported with the axis of the electrodes 48, 49, 101 and 102 horizontal, and for this purpose, it may be mounted in gimbals, which are not shown.

The making and breaking of the circuit in the evacuated cell of the device will not cause appreciable wear or burning of the electrodes and the speed at which the mechanism operates can be varied, as by varying the number of electrodes, etc., to produce the desired frequencies. The cell is located inside the rotor and is thereby protected from mechanical injury and an extremely compact mechanism is provided.

The cell which has been described is adapted to be used to replace commutators, brushes and other similar current changing means which are usually employed in the construction of motors, generators and other electrical equipment and devices in which such means is used.

While the specific embodiments of the invention have been described with reference to the use of a cell formed of glass-like material, it is to be understood that other materials which are not affected by mercury or other electro-conductive material, may be used in the construction of the cell, such for example as various metals, plastics and especially-treated woods.

I claim:

1. A device of the character described, including a cell continuously rotatable about a fixed axis, an electrode extending through one wall of the cell and into the interior thereof, a second electrode extending through the opposite end wall of the cell and into the interior of the cell, said electrodes disposed substantially parallel to the axis of rotation of said cell, a flowing electro-conducting body in the cell, said cell having a race in which the flowing body moves relatively to the walls of the cell, said electrodes having portions extending into the race, and means for rotating said cell.

2. In a current interrupting or selecting device, means forming a cell continuously rotatable about a fixed axis; an electro-conductive flowing body in said cell, said cell including an annular race for said body to travel relatively to the walls of said cell, an electrode extending through an end wall of said cell and having a part disposed in said race for engagement with said body, and means disposed within the cell and presenting a surface extending substantially completely across said race in opposed spaced relation thereto, said surface being substantially in contact with the surface of said body and functioning to prevent turbulence of said body while said device is brought up to speed.

3. In a current interrupting or selecting device, means forming a cell continuously rotatable about a fixed axis, an electro-conductive flowing body in said cell, said cell including an annular race for said body to travel relatively to the walls of said cell when the cell rotates, an electrode extending through an end wall of the cell and rotatable with said cell and having a part thereof disposed in said race for engagement with said body, and means disposed within the cell and presenting a surface substantially concentric with and extending substantially completely across said race in opposed spaced relation thereto, said surface being substantially in contact with the surface of said body and functioning to prevent turbulence of said body while said device is brought up to speed.

4. In a current interrupting or selecting device, means forming a cell continuously rotatable about a fixed axis and having an annular race therein; an electro-conductive fluid body in said cell, and movable relatively to said race, an electrode extending through an end wall of the cell and having a part thereof extending into said race within the path of movement of said fluid body, and means disposed within said cell presenting a surface substantially concentric with said race and extending substantially completely across said race in opposed spaced relation thereto, said surface being substantially in contact with the surface of said body and functioning to prevent turbulence of said body while said device is brought up to speed.

5. In a current interrupting or selecting device, means forming a cell continuously rotatable about a fixed axis, an electro-conductive flowing body in said cell, said cell including an annular race for said body to travel relatively to the walls of said cell when the cell rotates, two electrodes extending through the end walls of said cell and rotatable with said cell and spaced from one another and each having a part disposed in said race and means disposed within the cell and presenting a surface substantially concentric with and extending substantially completely across said race in opposed spaced relation thereto, said surface being substantially in contact with the surface of said body and functioning to prevent turbulence of said body while said device is brought up to speed.

6. In a current interrupting or selecting device, means forming a cell continuously rotatable about a fixed axis, an electro-conductive flowing body in said cell, said cell including an annular race for said body to travel relatively to the walls of said cell when the cell rotates, two electrodes extending through the end walls of said cell and rotatable with said cell and spaced from one another and each having a part thereof disposed in said race, the parts of said electrodes being disposed adjacent one another in said race for effecting simultaneous contact of said parts with said body, and means disposed within said cell and having a surface substantially concentric with and extending substantially completely across said race in opposed spaced relation thereto, said surface being substantially in contact with the surface of said body and functioning to prevent turbulence of said body while said device is brought up to speed.

7. In a current interrupting or selecting device, means forming a cell continuously rotatable about a fixed axis, an electro-conductive flowing body in said cell, said cell including an annular race for said body to travel relatively to the walls of said cell when the cell rotates, a plurality of electrodes extending through the end walls of said cell and rotatable with said cell, said electrodes extending into said race within the path of said body, and means disposed within said cell and having a surface substantially concentric with and extending substantially completely across said race in opposed spaced relation thereto, said surface being substantially in contact with the surface of said body and functioning to prevent turbulence of said body while said device is brought up to speed.

8. A current interrupting device including a cell continuously rotatable about a fixed axis, a dielectric body inside the cell, a pair of electrodes extending through the walls of said cell, the inner ends of said electrodes being secured in spaced relation in said dielectric body, said cell having a race extending circumferentially of said cell, a body of electro-conductive material in said race and flowable in said race relatively to the walls of said cell when the cell is rotated, the inner ends of said electrodes having parts extending into said race, said dielectric body having a surface substantially concentric with and extending substantially completely across said race in opposed spaced relation thereto, said surface being substantially in contact with the surface of said body and functioning to prevent turbulence of said electro-conductive body while said device is brought up to speed, and means for rotating the cell.

9. A current interrupting device including, a cell continuously rotatable about a fixed axis, a pair of electrodes extending through the walls of said cell, the inner ends of said electrodes being in spaced relation inside the cell, said cell having a race extending circumferentially of said cell, a body of electro-conductive material in said race and flowable in said race relatively to the walls of said cell when the cell is rotated, the inner ends of said electrodes having parts extending into said race, means disposed within said cell and having a surface substantially concentric with and extending substantially completely across said race in opposed spaced relation thereto, said surface being substantially in contact with the surface of said body and functioning to prevent turbulence of said body while said device is brought up to speed, and means for rotating the cell.

10. A device of the character described including, a rotatable cell; a rod-like electrode extending through one end wall of the cell and into the interior thereof; a second rod-like electrode extending through the opposite end wall of the cell in axial alignment with the first mentioned electrode and into the interior of the cell, the inner ends of the electrodes being bifurcated and embedded in a dielectric body in spaced relation, the tines of the bifurcated ends extending from said dielectric body radially with respect to the axis of the electrodes; a flowing electro-conducting body in the cell, said cell having a race in which the flowing body moves relatively to the walls of the cell, said tines extending into the race; and means for rotating said electrodes about the axis thereof.

11. In a current interrupting or selecting device, means forming a cell rotatable about a fixed axis, an electro-conductive flowing body in said cell, said cell including an annular race for said body to travel relatively to the walls of said cell when the cell rotates, an electrode comprising a bifurcated element rotatable with said cell with end portions of the tines thereof disposed in said race, and means disposed within said cell and having a surface substantially concentric with and extending substantially completely across said race in opposed spaced relation thereto, said surface functioning to prevent turbulence of said body while said device is brought up to speed, said last-named means supporting said electrode.

12. In a current interrupting or selecting device, means forming a cell continuously rotatable about a fixed axis, an electro-conductive flowing body in said cell, said cell including an annular race for said body to travel relatively to the walls of said cell when the cell rotates, and a plurality of electrodes extending through opposite walls of the cell, rotatable with said cell, and disposed generally parallel to the axis of the rotation thereof, at least one of said electrodes having a part disposed in said race, and another electrode being annular and co-extensive with said race, said last-named electrode being in constant contact with said flowing body, and means disposed within said cell and having a surface extending substantially completely across said race in opposed spaced relation thereto, said surface functioning to prevent turbulence of said body while said device is brought up to speed.

13. In a current interrupting or selecting device, means forming a cell continuously rotatable about a fixed axis, an electro-conductive flowing body in said cell, said cell including an annular race for said body to travel relatively to the walls of said cell when the cell rotates, and a plurality of electrodes extending through opposite walls of the cell, rotatable with said cell, and disposed generally parallel to the axis of rotation thereof, at least one of said electrodes having a part disposed in said race, and another electrode being substantially coextensive with said race but independent of the material forming said cell, said last-named electrode being in constant contact with said flowing body, and means disposed within said cell and having a surface extending substantially completely across said race in opposed spaced relation thereto, said surface functioning to prevent turbulence of said body while said device is brought up to speed.

14. In combination, a stator member, a rotor member mounted for continuous rotation about a fixed axis within the stator member, said rotor member including a hollow central portion, field windings mounted on the stator, an energizing circuit for said field windings including a rotary current interrupting device, means for mounting said interrupting device coaxially of and within said central hollow portion of the rotor for rotation with said rotor, said interrupting device comprising a cell having an annular race therein, a body of electro-conductive flowing material in said race and electrodes disposed for contact with said flowing body as the cell rotates to thereby make and break said energizing circuit to periodically energize said field windings at a frequency sufficient to cause continuous rotation of the cell, said mounting means including a portion of at least one electrode extending externally of the cell and supportingly engaging the rotor, and means for connecting at least one of said electrodes in circuit with the field windings.

15. In combination, a stator member, a rotor member mounted for continuous rotation about a fixed axis within the stator member, field windings mounted on the stator, an energizing circuit for said field windings including a rotary current interrupting device, means for mounting said interrupting device for actuation by said rotor, said device comprising a cell having an annular race therein, a body of electro-conductive flowing material in said race and electrodes disposed for contact with said flowing body as the cell rotates to thereby make and break said energizing circuit to periodically energize said field windings at a frequency sufficient to cause continuous rotation of the cell, said mounting means including electrode portions extending externally of the cell and supportingly engaging the rotor whereby the cell is supported within the rotor by said electrode extensions, and means for connecting at least one of the electrodes in circuit with the field windings.

16. In combination, a stator member, a rotor member mounted for continuous rotation about a fixed axis within the stator member, said rotor member including a hollow central portion and tubular axially disposed journal members communicating with the hollow central portion, field windings mounted on the stator, an energizing circuit for the field windings including a rotary current interrupting device, means for mounting said interrupting device centrally within the hollow central portion of the rotor for rotation with said rotor, said device comprising a cell having an annular race therein, a body of electro-conductive flowing material in said race and electrodes disposed within the cell for contact with said flowing body as the cell rotates to thereby make and break said energizing circuit to periodically energize said field windings at a frequency sufficient to cause continuous rotation of the cell, said mounting means including portions of the electrodes extending externally of the cell and disposed within the tubular journal members of the rotor.

17. In combination, a stator member, a rotor member mounted for continuous rotation about a fixed axis within the stator member, field windings mounted on the stator, an energizing circuit for said field windings including a rotary current interrupting device, means for mounting said interrupting device for actuation by said rotor, said device comprising a cell having an annular race therein, a body of electro-conductive flowing material in said race and electrodes disposed for contact with said flowing body as the cell rotates to thereby make and break said energizing circuit to periodically energize said field windings at a frequency sufficient to cause continuous rotation of the cell, each of said electrodes including a portion extending externally of the cell coaxially of the rotor and engaging the rotor axially thereof whereby the cell is supported by the electrodes within the rotor, and means for connecting at least one of the electrodes in circuit with the field windings.

FLOYD A. SHERMAN.